Inventor
GRAEME GORDON HARVEY

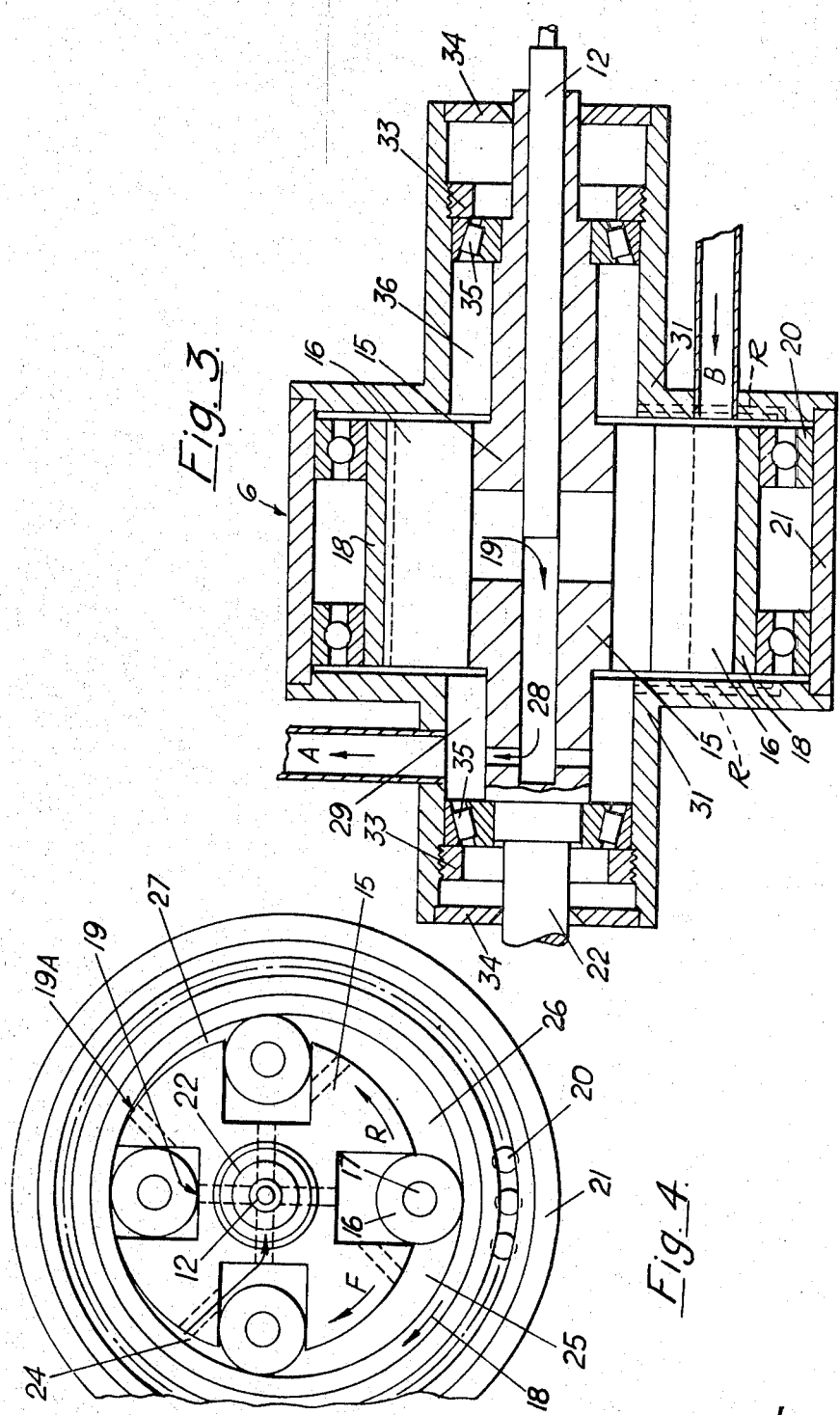

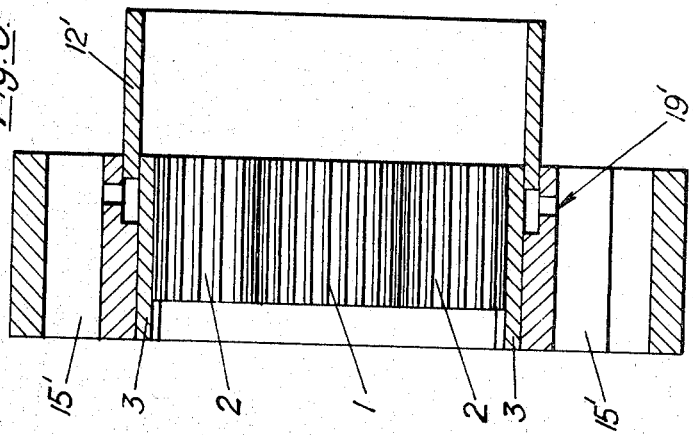
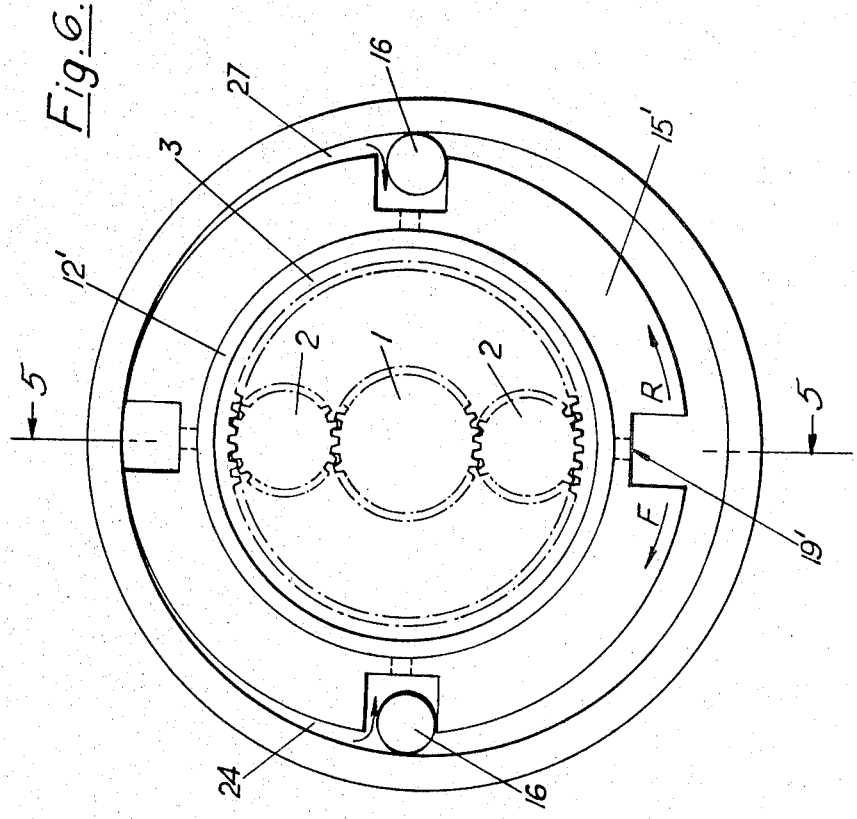

United States Patent Office 3,563,113
Patented Feb. 16, 1971

3,563,113
AUTOMATIC PLANETARY GEARBOX PRODUCING INFINITELY VARIABLE SPEED RATIOS
Graeme Gordon Harvey, 3 Benatar Way,
Alexandra Park, Salisburg, Rhodesia
Filed May 13, 1968, Ser. No. 728,395
Claims priority, application Rhodesia, May 11, 1967, 194/67
Int. Cl. F04b 23/10, 41/00; F16h 57/10
U.S. Cl. 74—786     3 Claims

ABSTRACT OF THE DISCLOSURE

A fluid braking apparatus is arranged to brake to a controlled and variable extent one of the components of a planetary gearing to secure a continuous variation of the ratio of the speeds of an input component and an output component of the gearing. Governor means responsive to the speeds of the input and output components of the gearing is connected to the braking apparatus to influence the braking action exerted on the braked component of the gearing. The input component is the sun wheel and the output component is a planet carrier upon which is mounted planet wheels. The braked component is an annulus driven by the gearing. A pump is driven by the annulus, and a valve on the rotor shaft of the pump is controlled by the governor means controllably restricting the flow of fluid from the pump to brake the pump and annulus.

---

This invention relates to planetary gearing with means for controlling the speed ratios of the input and output shafts.

An object of the present invention is to provide planetary gearing including fluid braking apparatus arranged to brake to a controlled and variable extent one of the components of the gearing whereby continuous variation of the ratio of the speeds of two further components of the gearing can be obtained, the further components serving as an input component and an output component.

A further object is to include governor means responsive to the speeds of the input and output components and connected to a braking apparatus to influence the braking action exerted on the braked component.

A still further object is to provide an embodiment wherein the input component is a sun wheel, the output component is a planet carrier upon which are mounted planet wheels, and the braked component is an annulus. In this embodiment the fluid braking apparatus includes a pump driven from the braked component, and a valve for controllably restricting the flow of fluid from said pump whereby a braking action is exerted on the pump and hence on said braked component. The pump can be a rotary vane pump including a rotor which is eccentrically mounted within a housing which is free to rotate and which is, in use, driven by frictional contact with vanes carried by the rotor.

With the above and other objects in view which will become apparent from the detailed description below, some preferred embodiments are shown in the drawings in which:

FIG. 3 is a cross-sectional view of the pump apparatus.

FIG. 4 is a partial diagrammatic view of the rotor of the pump apparatus.

FIG. 5 is a cross-sectional view taken substantially on line 5—5 of FIG. 6 with certain parts in elevation showing a modification, and FIG. 6 is an end view showing diagrammatically the construction of FIG. 5.

Figure 1:
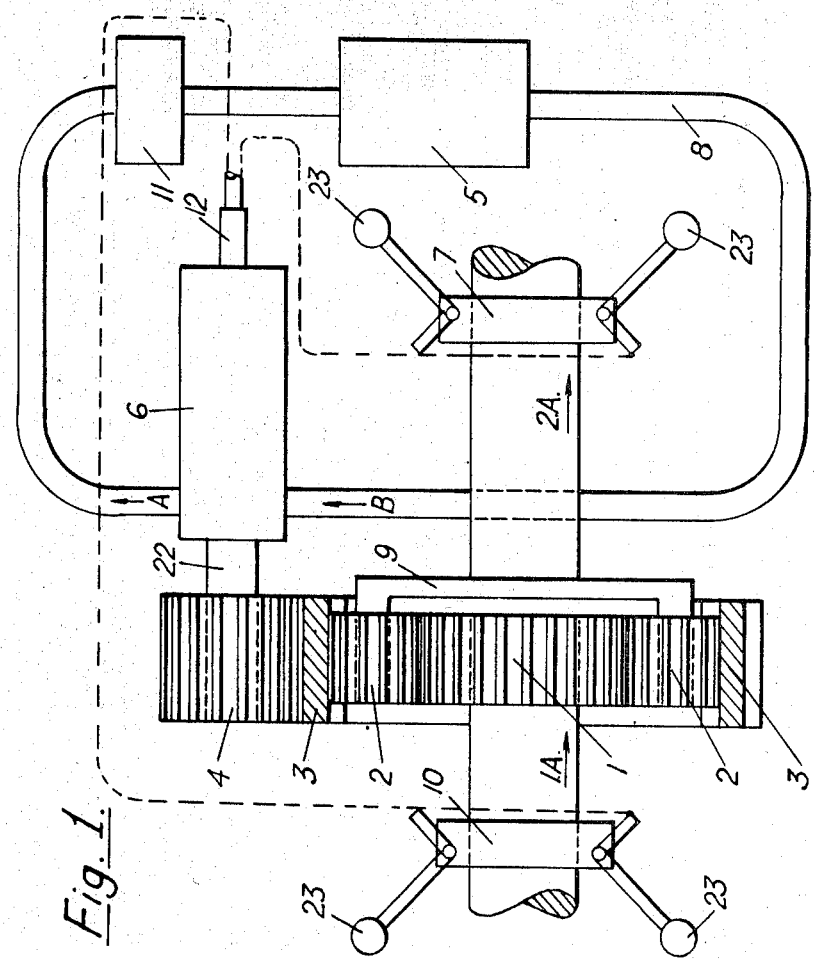
FIG. 1 is a diagrammatic view illustrating one form of the invention.

In FIG. 1 the shaft 1A is the driving shaft and the shaft 2A is the driven shaft. An electric motor may be used to drive the shaft 1A and the sun gear 1. The shaft 2A is attached to the planet carrier 9 carrying the planet gears 2. The gears 2 rotate on pins attached to the planet carrier 9. The planet gears 2 are in mesh with the annular gear or annulus 3. If the annulus 3 slows and the sun gear 1 maintains a constant speed the planet gears 2 will react on the annulus 3 causing the planet carrier 9 and the attached shaft 2A to rotate. The more the annulus 3 slows the faster the shaft 2A rotates until the annulus 3 becomes stationary and the shaft 2A runs at maximum speed.

The slowing or braking of the annulus 3 is accomplished as follows: A fluid braking apparatus 6 is driven by the shaft 22 attached to a gear 4 which is in mesh with an external gear provided upon the annulus 3. The fluid apparatus 6 is constructed as shown more particularly in FIG. 3 and has a rotor 15 connected to the shaft 22 of the gear 4. The rotor rotates in the direction of the arrow F in FIG. 4.

The rotor 15 is eccentrically mounted on bearings 35 in the casing 21 and is provided with slots which contain the vanes 16. The vanes 16 move radially within the slots and come into contact with the rolling bore by centrifugal force.

Hydraulic fluid occupying the space 25 is subjected to a pressure since the space 25 diminishes in volume on rotation of the rotor 15 and the vanes 16. The space 24 indicates the diminishing volume. The fluid within the spaces 24 and 25 flows through the bleed passages 19a and 19 as indicated by arrows in FIG. 3. This causes a pressure upon the vanes 16 forcing them into contact with the bore 18.

The bore is driven by frictional contact between the vanes 16 and the bore 18 rotating on bearings 20 in the direction of the arrow F.

The fluid passes down the bleed passages 19 to the center of the shaft 22 into the passage 28 past the valve 12. It then passes into the space 29 as shown by the arrow and flows to the outlet A. As shown in FIG. 1, from the outlet A the fluid passes to a cooler 11 and then continues its flow to the reservoir 5.

Fluid flows from the reservoir 5 replacing the fluid flowing out since the fluid space 27 by increasing in volume causes a suction in the space 26, see FIG. 4. Such fluid enters at B in FIG. 3.

The rotor 15 in FIG. 3 continues to rotate as long as the valve 12 allows fluid to pass. Upon restriction of the bleed passages 19 by a movement of the valve 12 the flow of fluid is controlled.

In FIGS. 3 and 4 it will be seen that the fluid is forced out of the spaces 24 and 25 and then through the passages 19A and 19 by the action of the vanes 16 and since the fluid speed is controlled the speed of the vanes 16 is also controlled and this in turn controls the speed of the rotor 15 driving the vanes 16.

This controls the shaft 22 and the gear 4 fixed to such shaft and this in turn controls the speed of the annulus 3.

Figure 2:
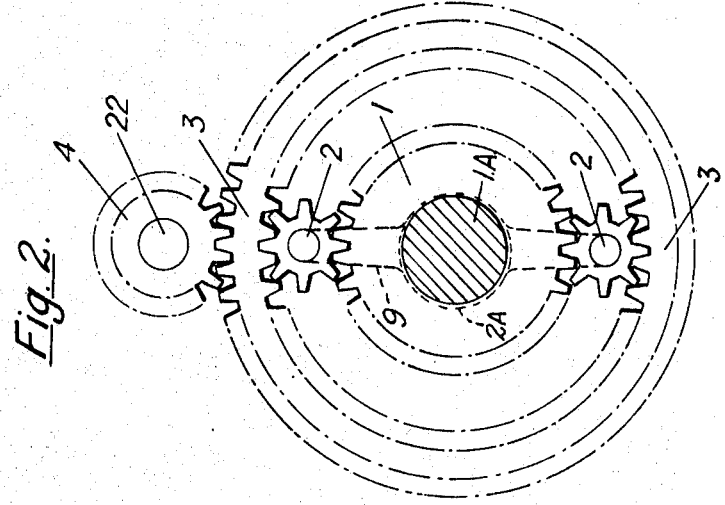
FIG. 2 is a diagrammatic view of one end of the planetary gearing.

When pressure builds up in the fluid spaces 24 and 25, FIG. 2, to a degree whereby the apparatus may rupture, this pressure acts directly upon the valve 12 causing it to move and thereby allow the excessive pressure to escape via the circulation system 28, 29 and A.

In FIG. 2, the end of the valve 12 may be stepped, not shown, or suitably shaped so as to allow fluid pressure to move said valve 12.

The automatic operation of the valve 12 takes place as follows: The centrifugal governors 7 and 10 in FIG. 1 are speed responsive with the weights 23 connected to L-shaped arms. The weights are held closed by a suitable spring, not shown.

The L-shaped arms of the governors 7 and 10, FIG. 1, are connected via any suitable linkage, not shown, to the valve 12 of the fluid apparatus 6 in such manner as to progressively operate the valve 12 as the speeds of the shafts driving said governors increase or decrease.

In the above way the valve 12 is automatically operated.

If an overload occurs on the band saw causing the shaft 2A to slow, the governor 7 will slow, with consequent loss of centrifugal force, and allow the valve 12 to close slightly, thus raising the speed of the shaft 2A once more to its correct speed.

The governor 10, connected to the shaft 1A which the electric motor drives, safeguards the electric motor. Should the overload be so large as to cause the electric motor speed 1A to drop, the governor weights will lose force causing the valve 12 to open, thus allowing the shaft 1A to rise to its correct speed once more.

The annulus 3 may drive the rotor 15' of the fluid apparatus 6 by means of gear, FIG. 1, chain or belt, not shown, or may combine the annulus 3 and the rotor 15' as an integral unit, FIGS. 5 and 6.

In FIG. 5 the rotor 15' is shown formed and fixed directly to and around the annulus 3.

The space occupied previously by the valve 12 and the shaft 22 in FIG. 2, being occupied by the sun gear 1 and the planet gears 2.

As a result the valve 12' is shown in an alternate form in FIG. 5, functioning identically in every way to the valve 12 in FIG. 2 by closing off to a greater or lesser extent, the fluid bleed passages 19'.

The semi-schematic arrangement in FIGS. 5 and 6 does not show all of the vanes 16, nor the rolling bore 18 with its bearings 20 however these may be incorporated as in FIGS. 3 and 4.

The bearings 35 support the rotor 15 and shaft 22, FIG. 3, and the bearing adjusting nuts 33 adjust the position of the rotor 15 by moving the bearings 35 so as to place the rotor 15 equidistant between the end covers 31.

The centralizing of the rotor 15 obviates sliding friction between the rotor 15 and the end covers 31, there being a very small gap between same.

Fluid passages R connect the suction chamber, fluid space 26 of the fluid apparatus 6 to the two bearing spaces 29 and 36 so as to relieve any excess pressure in the bearing spaces which may act upon the fluid seals 34.

In FIG. 4, the vanes 16 as shown with a weight 17 in the center thereof, are of circular section, however, vanes of rectangular section may be incorporated when application demands.

If the fluid apparatus is to work on high pressures, a rectangular section vane is demanded due to the oil wedge being formed between circular section vanes and the rolling bore 18 the action of the said wedge reduces the effective pressure upon the vane 16.

Rectangular section vanes do not allow the formation of this wedge, and thus the vane is more easily able to maintain contact with the rolling bore 18.

If the rotor 15 rotates in the direction of the arrow R, there being no fluid passage 19A ahead of the vanes 16, no fluid pressure is available to hold said vanes 16 into contact with the rolling bore 18.

The result is that the aforementioned fluid wedge is formed between the rolling bore 18 and the vanes 16 and causes the vanes 16 to be pushed back into their slots in the rotor 15. Contact is thereby lost between the vanes 16 and the rolling bore 18, thus no pressure is created, therefore no fluid braking effect is accomplished. Instead, the rotor 15 is allowed to rotate freely.

In this manner, therefore, the fluid braking apparatus performs the function of a fluid freewheel, functioning as a brake in one direction only.

The function of the freewheeling action becomes necessary when the condition is such that a driven band saw, shaft 2A FIG. 1, slows gradually to a halt after the electric motor shaft 1A, has been caused to halt.

With the shaft 1A halted and the shaft 2A still rotating, the annulus 3 reverses its direction of rotation, causing the rotor 15 to reverse, thus the rotor 15 requires to be able to rotate freely.

The fluid apparatus becomes effective for both clockwise and counterclockwise directions of rotation with the noninclusion during manufacture of the forward facing bleed passages 19A in the rotor 15, FIG. 2.

FIG. 6 shows the exclusion of the forward facing bleed passages 19A. The fluid bleed passages 19' which connect the vane slots in the rotor 14 to the valve 12' are retained. As shown, the vanes 16 are made smaller than the slots which house same.

The vanes 16, being smaller than the slots in the rotor 15, lag behind when the rotor 15 rotates. A gap is thereby created ahead of the vanes 16.

This gap, which is created ahead of the vanes 16, replaces the forward facing bleed passages 19A.

This irrespective of direction of rotation of the rotor 15, a gap is formed ahead of the vanes 16, to perform the function of a forward facing bleed passage. Fluid is thereby allowed to enter ahead of the vane 16, and force same into contact with the rolling bore 18.

The fluid braking apparatus is thereby made effective for both directions of rotation.

The shafts and bearings, not shown, which support the planetary gear train, FIG. 1, may be enclosed in a suitable housing wherein lubricating oil is contained.

The tooth form and ratio of the planetary gear train may vary to suit differing applications and although in FIG. 1 the annulus 3 performs the function of the intermediate member of the planetary gear train, the annulus will not always be the intermediate member.

Each member, of the three members which make up any planetary gear train, may be selected as the intermediate member, the remaining two members serving as the driving member and the driven member as required.

I claim:

1. A pump structure comprising a pump including a casing; a rotor eccentrically mounted within said casing; vanes carried by said rotor and defining between themselves, the rotor and the casing variable volume pumping chambers; a substantially unrestricted outlet port communicating with each pumping chamber; the ports being formed in the rotor; and an outlet from the pump to which each of said ports is connected; and a valve functionally and operatively disposed between said ports and said outlet and displaceable between an open position in which fluid flow from said ports to said outlet is permitted, and a closed position in which said ports are closed off from one another and from said outlet.

2. A pump structure according to claim 1, in which said casing includes a rolling bore mounted on bearings whereby negligible sliding friction between the vanes and bore occurs, the frictional energy being dissipated as rolling friction in the bearings carrying the bore.

3. An automatic planetary gearbox for producing infinitely variable speed ratios, the gearbox comprising:
 (a) a planetary gear train having a driving member, a driven member and an intermediate member;
 (b) a vane pump disposed to be driven by the intermediate member and comprising a casing; a rotor eccentrically mounted within said casing; vanes carried by said rotor and defining between themselves, said rotor and said casing variable volume pumping chambers; a substantially unrestricted outlet port communicating with each pumping chamber, said ports being formed in said rotor; and an outlet passage to which each of said ports is connected; said passage being co-axial with the rotor, and said ports communicating with one another only via said passage; and (c) a valve slidably mounted in said passage and displaceable between a closed position in which it shuts off communication between said ports and the outlet passage, and a second position in which it permits flow of pumped fluid from said chambers to said passage through said ports, whereby the resistance exerted by the pumped fluid on the rotor and intermediate member can be varied.

References Cited

UNITED STATES PATENTS

| | | | |
|---|---|---|---|
| 929,018 | 7/1909 | Ripberger | 103—136A |
| 2,021,354 | 11/1935 | Ernst | 103—161 |
| 2,035,465 | 3/1936 | Erskine et al. | 103—136R |
| 2,725,013 | 11/1955 | Vlachos | 103—136A |
| 2,743,090 | 4/1956 | Malan | 103—136R |
| 3,366,069 | 1/1968 | Krueger | 103—136A |
| 3,397,598 | 8/1968 | Zierick | 103—136X |
| 1,325,434 | 12/1919 | Carey et al. | 103—161 |
| 1,990,212 | 2/1935 | Toncich | 74—774 |
| 2,191,907 | 2/1940 | De Filippis | 74—786 |
| 2,292,181 | 8/1942 | Tucker | 103—161 |
| 2,311,691 | 2/1943 | Porter | 74—786X |
| 2,588,342 | 3/1952 | Bidwell | 103—136A |
| 2,588,952 | 3/1952 | Baisch | 74—786X |
| 2,891,423 | 6/1959 | Connell et al. | 74—786 |
| 2,940,338 | 6/1960 | Wood | 74—786X |
| 2,992,616 | 7/1961 | Rineer | 103—136AX |

FOREIGN PATENTS

| | | | |
|---|---|---|---|
| 654,808 | 6/1951 | Great Britain | 103—136A |
| 56,219 | 6/1952 | France | 74—778 |
| 1,256,529 | 2/1961 | France | 74—790 |
| 562,333 | 5/1957 | Italy | 74—786 |

WILLIAM L. FREEH, Primary Examiner

T. C. PERRY, Assistant Examiner

U.S. Cl. X.R.

417—204, 236, 254; 418—255